US007826645B1

(12) United States Patent
Cayen

(10) Patent No.: US 7,826,645 B1
(45) Date of Patent: Nov. 2, 2010

(54) WIRELESS FINGERPRINT ATTENDANCE SYSTEM

(76) Inventor: Joseph D. Cayen, 6610 W. Lisbon Ave., Milwaukee, WI (US) 53210

( * ) Notice: Subject to any disclaimer, the term of this patent is extended or adjusted under 35 U.S.C. 154(b) by 921 days.

(21) Appl. No.: 11/709,478

(22) Filed: Feb. 21, 2007

Related U.S. Application Data

(60) Provisional application No. 60/775,560, filed on Feb. 22, 2006.

(51) Int. Cl.
*G06K 9/00* (2006.01)

(52) U.S. Cl. .................... 382/124; 340/5.83; 382/217; 713/186

(58) Field of Classification Search ................ 340/5.8, 340/5.82; 382/115, 124, 125, 126; 713/186, 713/202
See application file for complete search history.

(56) References Cited

U.S. PATENT DOCUMENTS

| | | | | |
|---|---|---|---|---|
| 4,731,525 | A | 3/1988 | Hice | |
| 5,459,305 | A | 10/1995 | Eriksson | |
| 5,956,696 | A | 9/1999 | Guryel | |
| 6,075,455 | A | 6/2000 | DiMaria et al. | |
| 6,173,153 | B1 | 1/2001 | Bittman | |
| 6,185,318 | B1 * | 2/2001 | Jain et al. | 382/125 |
| 6,484,260 | B1 * | 11/2002 | Scott et al. | 713/186 |
| 6,487,306 | B1 * | 11/2002 | Jain et al. | 382/125 |
| 6,848,052 | B2 * | 1/2005 | Hamid et al. | 713/186 |
| 7,136,514 | B1 * | 11/2006 | Wong | 382/124 |
| 7,424,618 | B2 * | 9/2008 | Roy et al. | 713/186 |
| 2004/0059953 | A1 * | 3/2004 | Purnell | 713/202 |

* cited by examiner

*Primary Examiner*—Gregory M Desire
(74) *Attorney, Agent, or Firm*—Donald Cayen

(57) ABSTRACT

A wireless fingerprint attendance system comprises at least one fingerprint scanner and a computer server. First templates of fingerprint related data are stored on the server, and similar templates are stored on the scanner. When a fingerprint is scanned, the fingerprint data is transmitted wirelessly to the server, where a comparison is made. The server directs the scanner to display an indication whether or not a match was found. If available, an updated list of templates of fingerprint related data is transmitted from the server to the scanner and is added to the first templates. If a connection is not made, the scanned data remains on the scanner, which makes the comparison using the scanner templates. At periodic intervals the scanner and server attempt to connect. At a successful connection, the scanned fingerprint data is wirelessly transmitted to the server, and the scanned fingerprint data is purged from the scanner.

18 Claims, 5 Drawing Sheets

WIRELESS FINGERPRINT ATTENDANCE SYSTEM

This application claims the benefit of U.S. Provisional Patent Application Ser. No. 60/775,560 filed Feb. 22, 2006, and entitled Wireless Fingerprint Attendance system.

BACKGROUND OF THE INVENTION

1. Field of the Invention

This invention pertains to tracking the attendance of persons at specific events, and more particularly to apparatus for and methods of utilizing fingerprint recognition and wireless technologies to gather data related to the presence of persons at particular locations and times.

2. Description of the Prior Art

Various equipment has been developed to determine that persons are present at specific locations and at specific times. In the context of schools, for example, it has long been known for teachers to mark on paper class lists whether or not a student is absent or tardy. The lists were collected and sent to a central office for processing. While paper lists and manual marking of them were satisfactory in the past, that process has become too time consuming and cumbersome for modern education requirements.

U.S. Pat. No. 6,075,455 discloses a prior time and attendance system that includes multiple fingerprint scanners. Data generated by each scanner as determined from the fingerprints of persons attending an event is transmitted directly to an associated computer and thence to a central template containing data about the persons expected to attend the event. The fingerprint data provided by a person is compared at the database to ascertain whether or not the person's scanned data matches the previously stored data. Although a major advance over the traditional paper class lists, the system of the U.S. Pat. No. 6,075,455 possesses the disadvantage of requiring a computer for each fingerprint scanner as well as wiring from each scanner to its computer. Other systems for school attendance recording may be seen in U.S. Pat. Nos. 4,731,525; 5,459,305; 5,956,696; and 6,173,153.

U.S. Pat. Nos. 5,550,359 and 5,842,182 show non-fingerprint related techniques for determining time and attendance data.

U.S. Pat. No. 6,111,977 describes a hand-held portable fingerprint device that is used to enable or prevent access to a secured location.

U.S. Pat. Nos. 6,021,212; 6,848,052; and 6,850,632 teach various non-attendance related systems that use fingerprint scanning technologies.

Despite the numerous ways presently available for taking, storing, and recording attendance related data, there nevertheless remains a need for further improvements.

SUMMARY OF THE INVENTION

In accordance with the present invention, a wireless fingerprint attendance system is provided that greatly increases the efficiency of taking attendance at specified events. This is accomplished by apparatus that includes a fingerprint scanning device, hereinafter called a fingerprint scanner, that is capable of both comparing scanned fingerprints with a preprepared list of fingerprint templates on the scanner, and of wirelessly transmitting data related to the scanned fingerprints to a remote computer server also having the list of fingerprint templates.

The fingerprint scanner may be more or less permanently mounted proximate the location at which an event is to occur.

Alternately, the scanner may be portable and carried by one or more authorized attendants associated with an event.

Fingerprint related data is wirelessly transmitted between the fingerprint scanner and an attendance recording system (ARS) server. Preferably, the ARS server is part of a computer local area network (LAN). The LAN comprises well known components such as servers, a hub, a wireless gateway, workstation computers, and possibly an internet gateway. For example, the LAN may be installed in a school. The scanner and the ARS server are pre-supplied with respective templates of fingerprint data of all persons, whether students or adults, likely to attend a particular class or other activity.

A person attending a class or other activity places a finger on a fingerprint scanner, which reads the fingerprint. Immediately the scanner attempts to wirelessly transmit the scanned fingerprint data to the ARS server. If the transmission is successful, and if the person's scanned fingerprint is recognized by the ARS server, the server transmits a return signal such that the scanner displays acceptance, such as a "Welcome" display.

If the ARS server is temporarily incapable of receiving any data from the fingerprint scanner, no transmission occurs. In that case, the scanner makes the comparison of the scanned fingerprint with the scanner templates and initiates the "Welcome" display. The scanned fingerprint data then remains stored on the scanner until a transmission does occur with the ARS server. After a successful transmission, the stored scanned fingerprint data is purged from the scanner.

It is a feature of the invention that the fingerprint scanner continuously attempts to connect with the ARS server on a periodic basis for two reasons. The first is to transmit updated fingerprint templates from the ARS server to the scanner. The updated templates are input to the ARS server by means of any computer of the LAN. The second reason is to transmit any scanned fingerprint data that is stored at the scanner to the ARS server. The periodic attempts by the scanner to transmit to the ARS server are in addition to the transmission attempts that are made immediately when persons' fingerprints are scanned. Any scanned fingerprint data that is stored on the scanner remains there until a successful transmission. The intervals of the periodic attempts to connect may be equal in length and coincide, but staggered intervals of unequal lengths are also acceptable.

The fingerprint data associated with the persons attending a particular class or other activity as gathered by the wireless fingerprint attendance system is stored on the ARS server. When desired, a computer is commanded to access the stored data to determine the persons who attended, as well other information such as time and date of attendance. The attendance information may be used in various ways, such as printing reports related to the event and its attendance.

The method and apparatus of the invention, using a fingerprint scanner that wirelessly transmits scanned fingerprint data to an ARS server of a LAN, thus efficiently determines the persons who are present at a particular location and at a particular time. The probability of error in tracking attendance is remote, even though very large numbers of persons can be tracked.

Other advantages, benefits, and features of the present invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure and methods. The scope of the invention is defined in the claims appended hereto.

Figure 1:
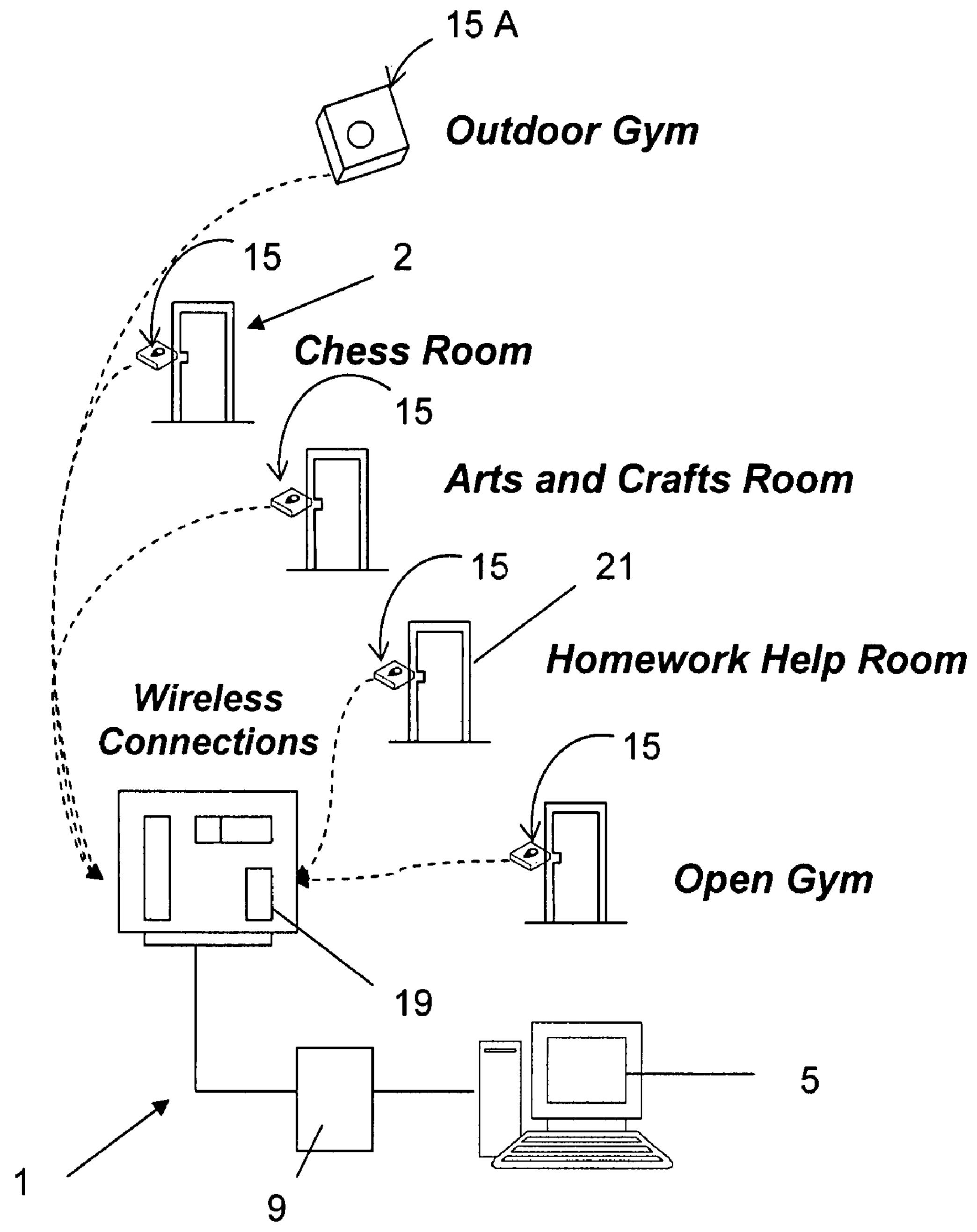
FIG. 1 is a first simplified schematic diagram of the wireless fingerprint attendance system of the present invention.

Referring first to FIG. 1, reference numeral 1 refers to the wireless fingerprint attendance system of the invention. The wireless fingerprint attendance system 1 is particularly useful for recording the attendance of persons at particular classes or other activities, at particular times, and in particular locations in school settings. However, it will be understood that the invention is not limited to education related applications.

Figure 2:
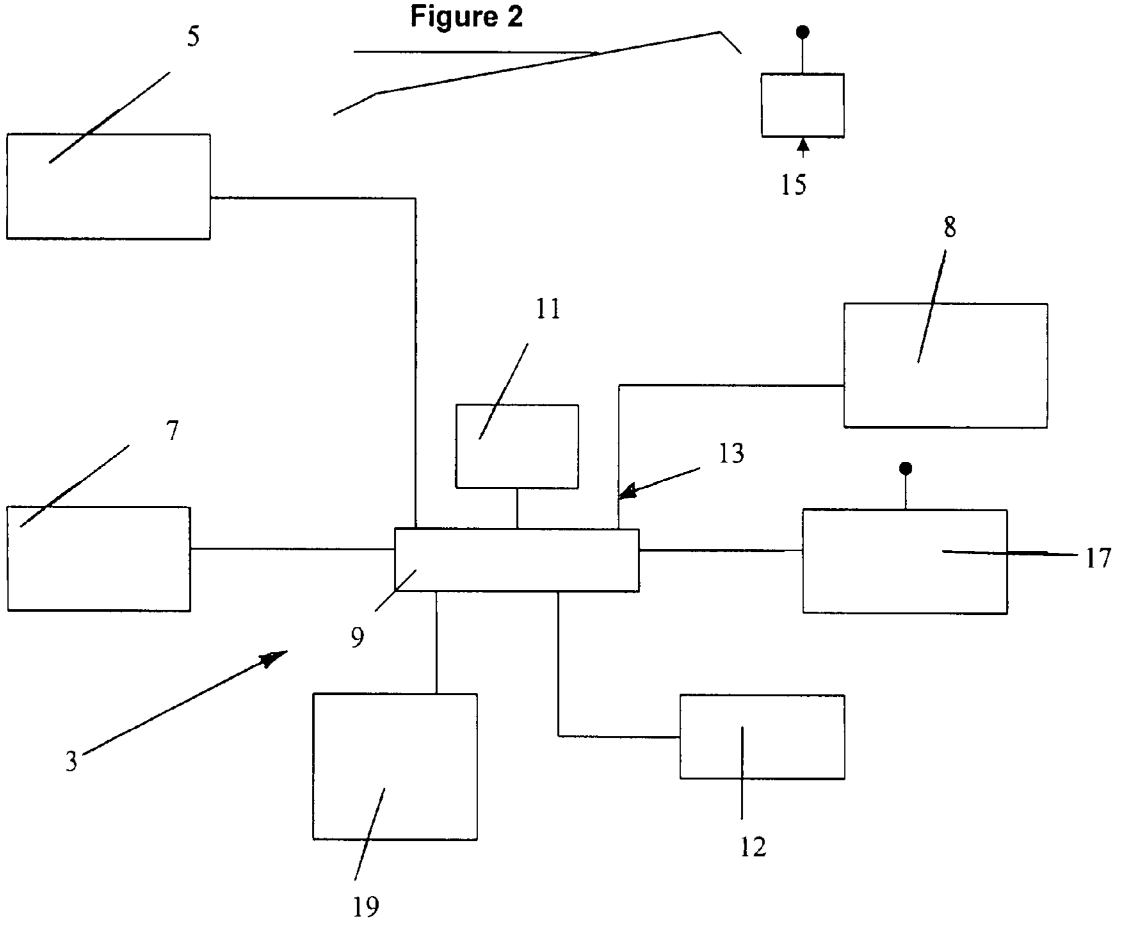
FIG. 2 is a second simplified schematic diagram of the wireless fingerprint attendance system of the present invention.

In accordance with one aspect of the invention, the wireless fingerprint attendance system 1 is incorporated into a school building 2 that is equipped with a computer local area network (LAN), FIG. 2. In FIG. 2, reference numeral 3 schematically depicts a typical LAN. For simplicity, and to facilitate explanation of the invention, the LAN 3 is shown as having only the most essential components, including one or more computer workstations; a hub 9; a server 11; and possibly an internet gateway 12. As illustrated, the LAN has three computer workstations 5, 7, and 8, but that number is merely representative. The foregoing LAN components are connected to each other by wires typically represented at reference numeral 13. The computer workstations 5, 7, and 8, hub 9, server 11, internet gateway 12, as well as their interconnections 13 that create the LAN, are all well known to persons skilled in the computer science/network administration field. Accordingly, no further description of them is considered necessary.

It is an important feature of the invention that the wireless fingerprint attendance system 1 is designed and constructed to be added to the school building LAN 3. The wireless fingerprint attendance system is comprised of one or more fingerprint scanners 15, a wireless gateway 17, and an attendance recording system (ARS) server 19. As shown in FIG. 1, a different fingerprint scanner 15 is secured proximate the entrance, such as a doorway 21, of any number of rooms at which attendance of persons is desired to be determined. In FIG. 1, four fingerprint scanners 15 are shown, but it will be recognized that more or fewer scanners can be used, depending on the particular attendance requirements of the school or other entity using the wireless fingerprint attendance system. FIG. 1 illustrates typical activities that may occur in the rooms associated with the respective school building doorways 21. In FIG. 2, the wireless gateway 17 and the ARS server 19 are connected to the LAN through the hub 9, but other types of connections to the LAN are also within the scope of the present invention.

Each of the fingerprint scanners 15 receives and stores an original list of fingerprint templates of data related to the fingerprints of persons who have registered for a class or other activity. The fingerprint templates on the scanner are known as scanner templates. The ARS server 19 is the original holder of all fingerprint templates known as server templates. Depending on the particular situation, a scanner may have the list of templates of only the persons who are reasonably expected to attend a class or other activity held in a room having a doorway 21 through which the persons enter. Alternately, a scanner may have a list of templates of all the persons enrolled in an entire school or program.

Figure 3:
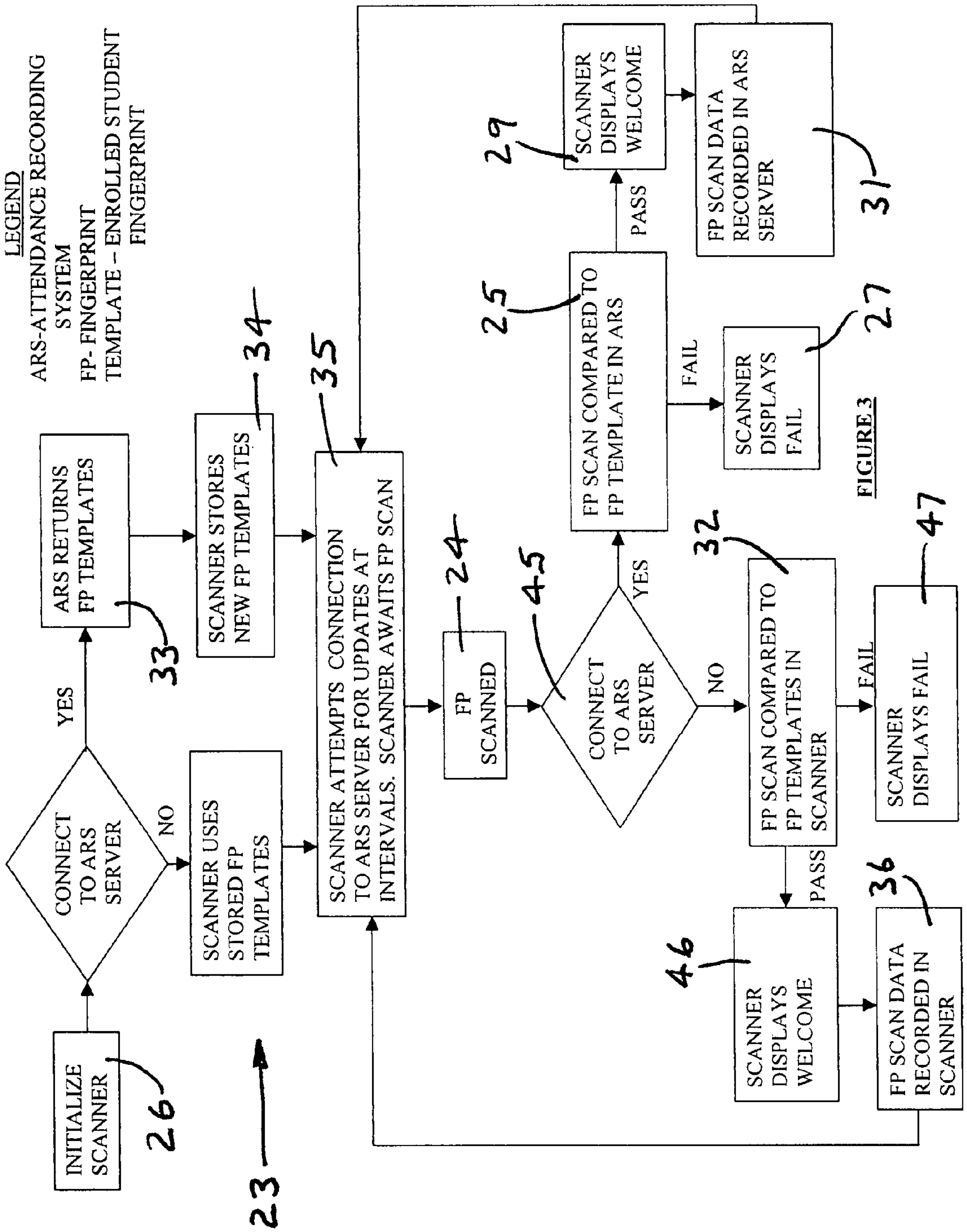
FIG. 3 is a flow chart of the process for operating the wireless fingerprint attendance system of the present invention.

FIG. 3 shows the flow chart 23 of the operation of the wireless fingerprint attendance system 1. The fingerprint scanner 15 with its original templates of fingerprint data is initialized, step 26. If at initialization there is no wireless connection to the ARS server 19, the scanner remains idle. If at initialization the scanner is wirelessly connected to the ARS server, the ARS server transmits an updated list of templates, if any, as will be explained presently, of fingerprint data to the scanner, step 33. The updated templates are stored on the scanner, step 34, along with the original scanner templates. The scanner is then ready to scan the fingerprints of persons, step 35.

Upon reading the fingerprint of a person, step 24 in FIG. 3, the fingerprint scanner 15 converts the physical characteristics of the fingerprint into alphanumerical scanned fingerprint data in known manner. The scanner immediately attempts to transmit the scanned fingerprint data to the ARS server 19, step 45. If a transmission is successful, the scanned fingerprint data is transmitted in a wireless fashion from the scanner to the ARS server 19, reference numeral 31, by way of the wireless gateway 17 and the LAN 3 (FIG. 2). The ARS server makes a comparison of the scanned fingerprint data with the ARS server templates, step 25. If a match is found, a return signal to that effect is transmitted back to the scanner, which then displays a message to that effect, step 29. For example, a light emitting diode on the scanner may display the characters "Welcome". If the ARS server does not determine a match, a notification to that effect, such as by a light emitting diode, is displayed on the scanner, step 27.

At the completion of the two-way transmission of scanned fingerprint data and return signal, the scanned fingerprint data is no longer on the scanner. The scanner is then ready to scan the next fingerprint, reference numeral 35. The scanning procedure is repeated until all the persons attending the class have had their fingerprints scanned. The scanner then remains idle until another class or group of persons arrives proximate the doorway 21.

It is contemplated that occasionally a transmission attempt between the fingerprint scanner 15 and the ARS server 19 at the time of a scan will not be successful. Possible reasons for an unsuccessful connection include temporarily inadequate available memory at the ARS server or the wireless connection being temporarily broken. In that situation, no signal is returned from the ARS server through the wireless gateway 17 back to the scanner. The scanner itself then performs the comparison between a scanned fingerprint and the list of fingerprint templates on the scanner, step 32. The scanner itself provides the impetus to display either a pass or fail display, step 46 or 47, respectively. The scanner then stores the scanned fingerprint data, step 36.

Further in accordance with the present invention, the fingerprint data contained on the ARS server may be changed at any time by means of inputs from the computer workstations 5, 7, or 8. This is because new persons may register at any time via input to the ARS server from one or more of the computer workstations 5, 7, or 8, and the new fingerprint templates must be available at the scanners for accepting the fingerprint scans of the new persons.

At first periodic intervals, which may be approximately five minutes, the fingerprint scanner 15 seeks any updated fingerprint templates from the ARS server 19, as will be explained more fully below, particularly with reference to FIG. 4A. Any new templates transmitted to the scanner are added to the list of original scanner templates.

In the preferred embodiment, the wireless fingerprint attendance system 1 utilizes second periodic intervals to transmit any scanned fingerprint data that is stored on the fingerprint scanner 15. At each second interval, the stored scanned fingerprint data is transmitted to the ARS server. A return signal from the ARS server indicates a successful transmission. The stored scanned fingerprint data is then purged from the scanner. If desired, the two periodic intervals may coincide, but staggered intervals, as well as intervals of unequal length, are also acceptable.

In accordance with a further aspect of the present invention, the fingerprint scanners 15 need not be secured to a building in order for the wireless fingerprint attendance system 1 to work. In FIG. 1, reference numeral 15A represents a portable fingerprint scanner that is carried by an attendant who is outside of the building 2. For example, the fingerprint scanner 15A may be carried by a teacher of an outdoor gym class. Students attending the class have their fingerprints scanned by the fingerprint scanner 15A. The fingerprint scanner 15A may well be out of range for wirelessly transmitting the fingerprint data to the ARS server 19. That is, the scanner does not connect to the ARS server either at the time the students' fingerprints are scanned nor at any of the periodic attempts. That situation causes no difficulty, because the scanner template of fingerprint data is used to recognize the scanned fingerprints, as explained above. The scanned fingerprint data is stored on the fingerprint scanner 15A until the teacher returns within range. Upon reaching the next time interval for transmitting stored scanned fingerprint data, a transmission is attempted. If successful, the students' fingerprint data is wirelessly transmitted to the ARS server 19, and the stored scanned fingerprint data is purged from the scanner, as explained previously.

Figure 4A:
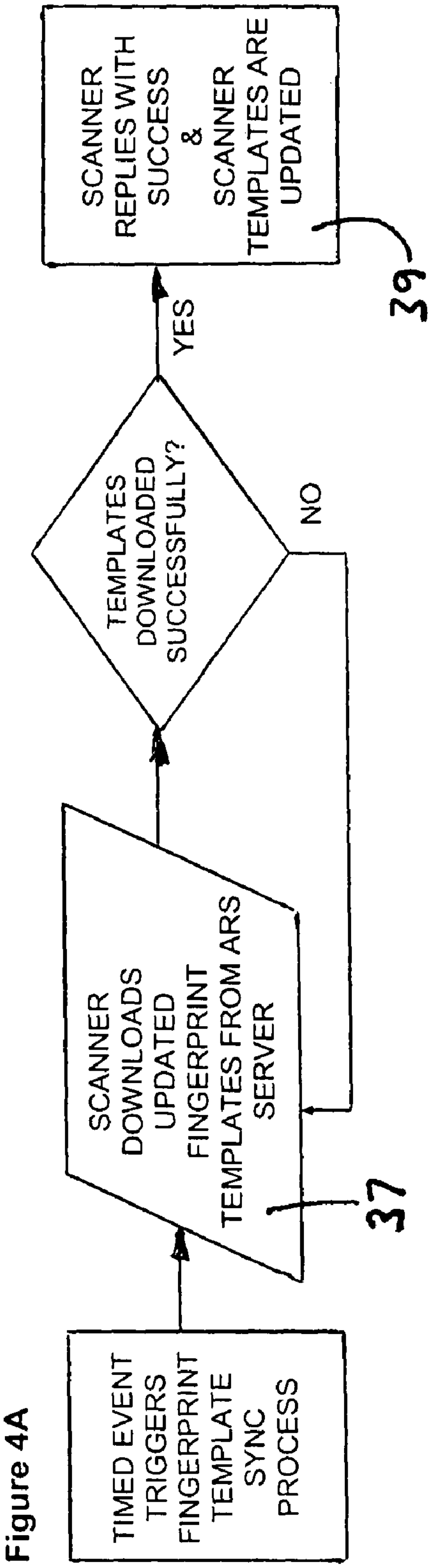
FIGS. 4A and 4B are flow charts of the communications performed by the present invention between the fingerprint scanner and the attendance recording system (ARS) server.
Figure 4B:
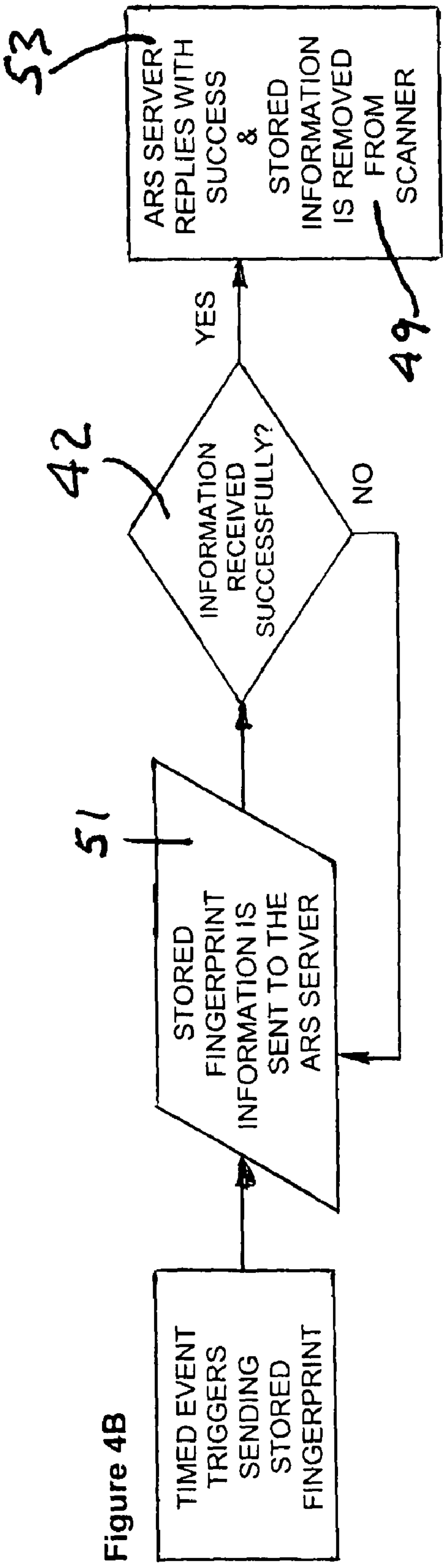

FIGS. 4A and 4B show in greater detail the two types of internal communications of the wireless fingerprint attendance system 1. FIG. 4A shows in more detail the steps that are part of the synchronization between the fingerprint scanner 15 and the ARS server 19 that occurs at the periodic intervals of approximately five minutes. The scanner sends a request to the ARS server for any fingerprint templates that are new or that have been updated since the last synchronization. Reference numeral 37 represents the step of updating the list of fingerprint templates at the scanner with those that are new or have been updated. The scanner displays a signal that indicates success in receiving the new and updated fingerprint templates from the ARS server, reference numeral 39.

FIG. 4B shows in detail the steps that comprise the transmission of data at the end of another periodic interval subsequent to a prior unsuccessful transmission attempt. In that case, there is scanned fingerprint data stored on the fingerprint scanner 15 at the transmission attempt. Upon connecting, the stored fingerprint data is wirelessly transmitted to the ARS server, reference numeral 51. Reference numeral 42 indicates the step of deciding whether or not the transmittal of fingerprint data from the scanner to the ARS server was successful. The ARS server replies with a success or fail signal, reference numeral 53. If a successful transmission occurs, the stored scanned fingerprint data on the scanner is purged, reference numeral 49. As mentioned previously, the processes illustrated in FIGS. 4A and 4B may, but need not, occur at the same time intervals.

Figure 5:
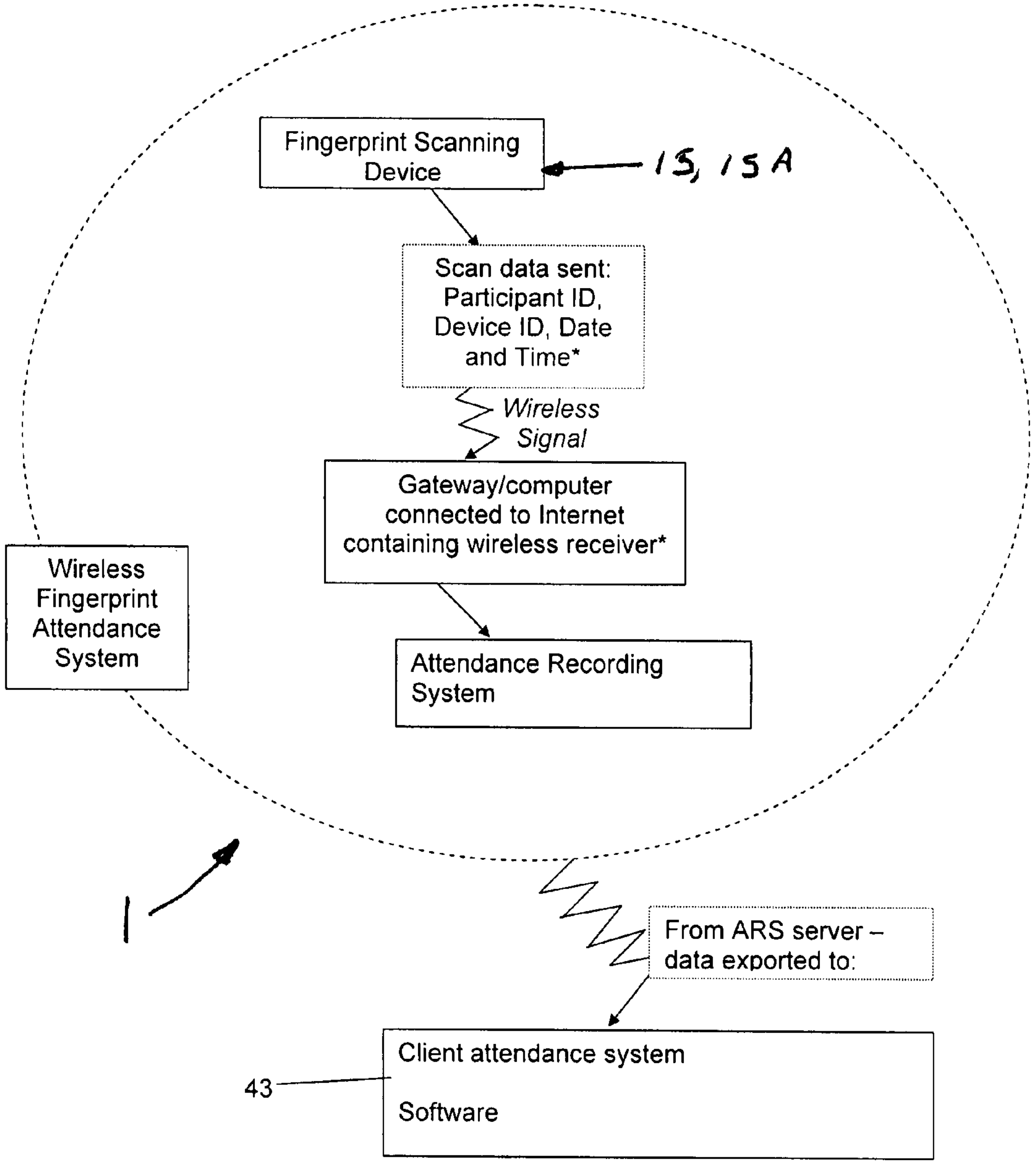
FIG. 5 is another simplified schematic of the apparatus and method of the invention.

FIG. 5 shows another representation of the apparatus and method of the wireless fingerprint attendance system 1, with appropriate reference numerals shown. In addition, FIG. 5 shows a further step 43 that may be added to the wireless fingerprint attendance system. That step 43 is the utilization of the scanned fingerprint data by the school or other entity in a separate proprietary software system that requires the use of attendance data as collected by the Wireless Attendance System. This separate software program could be used on a computer workstation 5, 7, or 8 (FIG. 1) to generate a written report that contains selected information about the attendance at a specific event.

In summary, the results and advantages of taking attendance of persons attending particular events can now be more fully realized. The wireless fingerprint attendance system 1 provides both immediate recognition or non-recognition of persons attending a particular event as well as a permanent record of the attendance data. This desirable result comes from the combined functions of the fingerprint scanners 15 and 15A. Templates of fingerprint data of persons who could possibly attend the event are stored on the scanners and also on the ARS server 19 of the LAN 3. Fingerprint related data pertaining to the presence of the person is transmitted wirelessly to the ARS server from the scanners. The transmission may be immediate, or it may be delayed, depending on the ability of the ARS server to receive the data at any particular moment. An attending person is recognized if his fingerprint finds a match in either set of templates.

It will also be recognized that in addition to the superior performance of the wireless fingerprint attendance system 1, its construction and operation are such as to significantly reduce the costs associated with tracking attendance at events. Also, since there are few mechanical working components, the need for maintenance is minimal.

Thus it is apparent that there has been provided, in accordance with the invention, a wireless fingerprint attendance system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method of determining attendance at a particular place and time comprising the steps of:

a. supplying a list of scanner templates of selected fingerprint data on a fingerprint scanner;

b. supplying a list of server templates of the selected fingerprint data on a computer server;

c. scanning a fingerprint of a person by the fingerprint scanner and thereby creating scanned fingerprint data;

d. wirelessly transmitting the scanned fingerprint data to the server;

e. comparing the scanned fingerprint data to the server templates, and determining whether or not the server templates recognize the scanned fingerprint data;

f. wirelessly transmitting a first signal from the server to the fingerprint scanner indicative of whether or not the server templates recognize the scanned fingerprint data;

g. displaying a message on the fingerprint scanner indicative of whether or not the server templates recognize the scanned fingerprint data; and h. storing the scanned fingerprint data on the server.

2. The method of claim 1 comprising the further steps of:

a. wirelessly transmitting at least one updated template of fingerprint related data from the computer server to the fingerprint scanner; and b. adding the at least one updated template to the list of scanner templates.

3. The method of claim 2 comprising the further step of wirelessly transmitting a signal from the fingerprint scanner to the computer server in response to transmitting the at least one updated template from the server to the fingerprint scanner.

4. The method of claim 2 wherein the step of wirelessly transmitting at least one updated template of scanned fingerprint data from the computer server to the fingerprint scanner comprises the step of wirelessly transmitting at least one updated template of scanned fingerprint data at periodic intervals.

5. A method of determining the presence of persons at a particular place and time comprising the steps of:

a. supplying respective lists of templates containing fingerprint related data to a fingerprint scanner and to a computer server;

b. scanning a fingerprint of a selected person on the fingerprint scanner and thereby producing scanned fingerprint data pertaining to the selected person;

c. comparing the scanned fingerprint data with the list of templates on the fingerprint scanner;

d. displaying on the fingerprint scanner a message indicative of whether or not the scanned fingerprint data is recognized by the list of templates on the fingerprint scanner;

e. wirelessly transmitting the scanned fingerprint data on the fingerprint scanner to the server; and f. storing the scanned fingerprint data on the server.

6. The method of claim 5 comprising the further step of sending a first return signal from the server to the fingerprint scanner in response to wirelessly transmitting the scanned fingerprint data from the fingerprint scanner to the server.

7. The method of claim 5 comprising the further step of utilizing the fingerprint data stored on the server to generate a written report concerning the selected person.

8. A method of determining the presence of persons at a particular place and time comprising the steps of:

a. supplying respective lists of templates containing fingerprint related data to a fingerprint scanner and to a computer server;

b. scanning a fingerprint of a selected person on the fingerprint scanner and thereby producing scanned fingerprint data pertaining to the selected person;

c. comparing the scanned fingerprint data with the list of templates on the fingerprint scanner;

d. displaying on the fingerprint scanner a message indicative of whether or not the scanned fingerprint data is recognized by the list of templates on the fingerprint scanner;

e. providing an updated template of selected fingerprint data at the server;

f. transmitting the updated template to the fingerprint scanner; and g. adding the updated template to the list of templates at the scanner.

9. The method of claim 8 comprising the further step of sending a second return signal from the fingerprint scanner to the server in response to transmitting the updated template to the fingerprint scanner.

10. A method of determining the presence of persons at a particular place and time comprising the steps of:

a. supplying respective lists of templates containing fingerprint related data to a fingerprint scanner and to a computer server;

b. scanning a fingerprint of a selected person on the fingerprint scanner and thereby producing scanned fingerprint data pertaining to the selected person;

c. comparing the scanned fingerprint data with the list of templates on the fingerprint scanner;

d. displaying on the fingerprint scanner a message indicative of whether or not the scanned fingerprint data is recognized by the list of templates on the fingerprint scanner;

e. providing an updated template of selected fingerprint data at the server;

f. transmitting the updated template to the fingerprint scanner, wherein the step of transmitting the updated template to the fingerprint scanner comprises the steps of:

i. periodically wirelessly connecting the scanner and the server; and ii. transmitting the updated template to the fingerprint scanner during a periodic connection; and g. adding the updated template to the list of templates at the scanner.

11. The method of claim 10 wherein the step of periodically wirelessly connecting the scanner and the server comprises the step of wirelessly connecting the scanner and the server at five minute intervals.

12. A method of tracking attendance comprising the steps of:

a. providing a computer server having a list of first templates of fingerprint related data;

b. providing a fingerprint scanner with a list of second templates of the fingerprint related data;

c. scanning a fingerprint of a person by the scanner and thereby producing scanned fingerprint data;

d. attempting but failing to wirelessly connect the scanner to the server in order to transmit the scanned fingerprint data to the server;

e. comparing the scanned fingerprint data with the first templates;

f. displaying on the scanner a message indicating whether or not the scanned fingerprint data finds a match on the first templates; and g. storing the scanned fingerprint data at the scanner.

13. The method of claim 12 comprising the further steps of:

a. successfully wirelessly connecting the scanner to the server subsequent to the step of attempting but failing to wirelessly connect the scanner to the server;

b. wirelessly transmitting the scanned fingerprint data stored at the scanner from the scanner to the server; and c. purging the stored scanned fingerprint data from the scanner.

14. The method of claim 13 comprising the further steps of:

a. making a third template of fingerprint related data on the server;

b. wirelessly transmitting the third template from the server to the scanner; and c. adding the third template to the list of second templates.

15. The method of claim 14 wherein the step of wirelessly transmitting the third template to the scanner comprises the step of wirelessly transmitting the third template to the scanner at second periodic intervals.

16. The method of claim 13 comprising the further step of wirelessly transmitting a return signal from the server to the scanner in response to transmitting the scanned fingerprint data from the scanner to the server.

17. The method of claim 12 wherein the step of attempting but failing to wirelessly connect the scanner to the server comprises the step of continuously attempting to connect at first periodic intervals.

18. The method of claim 12 wherein the step of attempting but failing to wirelessly connect the scanner to the server comprises the step of continuously attempting to connect at approximately five minute intervals.

* * * * *